(No Model.)
A. MARCEAU & F. MINIE.
RIM FOR WHEELS.
No. 516,725. Patented Mar. 20, 1894.
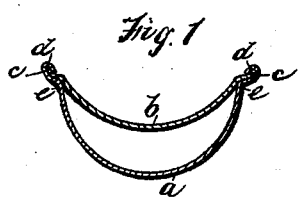
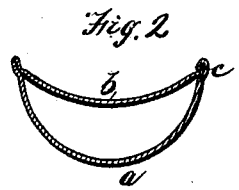
Witnesses
Fred A Bearse
Willie E. Peters
Inventors:
Alfred Marceau
Frank Minie
By Allen Webster
Attorney

UNITED STATES PATENT OFFICE.

ALFRED MARCEAU, OF SPRINGFIELD, AND FRANK MINIE, OF CHICOPEE, MASSACHUSETTS.

RIM FOR WHEELS.

SPECIFICATION forming part of Letters Patent No. 516,725, dated March 20, 1894.

Application filed April 28, 1893. Serial No. 472,262. (No model.)

*To all whom it may concern:*

Be it known that we, ALFRED MARCEAU, residing at Springfield, and FRANK MINIE, residing at Chicopee, in the county of Hampden, State of Massachusetts, citizens of the United States, have jointly invented new and useful Improvements in Rims for Wheels, of which the following is a specification, reference being had to the accompanying drawings and letters of reference marked thereon, in which drawings like letters of reference indicate like parts.

Figure 1 is a transverse sectional view of the preferred form of construction illustrating the rim when made of two strips united by our improved seam or joint. Fig. 2 is a like view of a modified form of the same, wherein the rim is made of a single strip.

In detail *a* indicates the portion of the rim to which the spokes are attached.

*b* indicates the portion upon which the tire rests.

*c* indicates the outwardly and upwardly turned edges of the strip *b*, and *d* indicates the outwardly-turned and over-lapping edges of the strip *a*.

The construction will be readily understood on reference to the drawings, wherein is illustrated our improved construction, the same being shown in two figures. The preferred form of construction is that illustrated in Fig. 1, wherein is shown a hollow rim for wheels formed of two strips, the edges of which are interlocked in such manner as to give a firm and unyielding joint and wherein the shape of the joint or seam is such as tends to strengthen the rim. The edges of the strip *a* are bent outwardly forming a shoulder at *e* and then carried upwardly and bent inwardly to engage the edges of the strip *b*. The edges of the strip *b* are shaped to conform to the outwardly bent edges of the strip *a* and are then carried upwardly as indicated in the drawings so as to lie between the over-turned edges of the strip *a*. It will be seen that the shape is such that the shoulder *e* will prevent all danger of the tire supporting strip *b* being forced inwardly, and that the interlocking of the outer edges of the strip *b* between the over-turned edges of the strip *a* will effectually prevent movement between the parts, so that we are enabled to construct a hollow rim of sufficient strength, rigidity and lightness without brazing or otherwise soldering or securing the parts together, the only brazing being at the ends of the rim to complete the circle.

In Fig. 2 we illustrate the same form of construction with the exception that instead of the rim being made of two strips we form it of one strip, and the edge of the rim at one side is shaped to correspond with the shape upon the opposite side, but is formed by bending the metal over against itself, and then carrying it across to be united at the opposite edge by the same form of seam or joint as that first described.

Having, therefore, described our invention, what we claim, and desire to secure by Letters Patent, is—

In a hollow rim for wheels, the combination of an outer rim for carrying the tire, and an inner rim for attachment to the spokes, each rim being bent outwardly at its sides to form a shoulder, the inner rim being supported at its shoulders in the angles of the shoulders of the outer rim, and being carried outwardly around the edges of the outer rim contiguous therewith to form a joint, substantially as described.

ALFRED MARCEAU.
FRANK MINIE.

Witnesses:
ALLEN WEBSTER,
FRED A. BEARSE.